United States Patent
Li

(10) Patent No.: US 10,823,584 B2
(45) Date of Patent: Nov. 3, 2020

(54) INTELLIGENT DEVICE HAVING DETACHABLE BODIES

(71) Applicant: Huawei Technologies Co., Ltd., Shenzhen (CN)

(72) Inventor: Taian Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/331,061

(22) PCT Filed: Sep. 6, 2016

(86) PCT No.: PCT/CN2016/098205
§ 371 (c)(1),
(2) Date: Mar. 6, 2019

(87) PCT Pub. No.: WO2018/045488
PCT Pub. Date: Mar. 15, 2018

(65) Prior Publication Data
US 2019/0226875 A1 Jul. 25, 2019

(51) Int. Cl.
*G01D 5/14* (2006.01)
*H04R 1/10* (2006.01)

(52) U.S. Cl.
CPC ............ *G01D 5/145* (2013.01); *H04R 1/10* (2013.01)

(58) Field of Classification Search
CPC ........ G01D 5/145; H04R 1/10; H04R 1/1016; H04R 1/1041; H04R 1/1066
USPC .......................... 324/207.2; 381/73, 370, 384
See application file for complete search history.

(56) References Cited

U.S. PATENT DOCUMENTS

| 8,891,798 B1 * | 11/2014 | Laffon de Mazieres ................... H04R 1/1033 381/370 |
| 9,408,021 B2 * | 8/2016 | Park ........................ H04M 1/05 |
| 9,516,401 B2 * | 12/2016 | McCarthy .............. H04R 1/105 |
| 9,609,420 B2 * | 3/2017 | Azmi .................... H04R 1/1058 |
| 9,723,394 B2 * | 8/2017 | Anderson ............ H04R 1/1041 |

(Continued)

FOREIGN PATENT DOCUMENTS

CN 201674630 U 12/2010
CN 102202250 A 9/2011
(Continued)

OTHER PUBLICATIONS

Machine Translation and Abstract of Chinese Publication No. CN103631134, Mar. 12, 2014, 10 pages.
(Continued)

*Primary Examiner* — Steven L Yeninas
(74) *Attorney, Agent, or Firm* — Conley Rose, P.C.

(57) ABSTRACT

An intelligent device having detachable bodies, where a Hall effect sensor and a magnet are respectively disposed on two detachable bodies, and the Hall effect sensor detects a magnetic field of the magnet to determine whether the two bodies are in an attracted state. In addition, an attraction magnet pair is disposed on each of the two bodies to implement attraction of the two bodies. Each attraction magnet pair includes two magnets having opposite polarities and disposed side by side. Such an attraction magnet combination reduces strength of a magnetic field in a direction of a non-magnetic pole, thereby reducing impact on detection on the magnetic field by the Hall effect sensor.

20 Claims, 8 Drawing Sheets

(56) References Cited

U.S. PATENT DOCUMENTS

| | | | |
|---|---|---|---|
| 10,419,838 B1* | 9/2019 | Criswell | H04R 1/1016 |
| 10,440,460 B2* | 10/2019 | McCarthy | H04R 1/1025 |
| 2007/0253584 A1* | 11/2007 | Rass | H04R 25/554 |
| | | | 381/312 |
| 2008/0317274 A1* | 12/2008 | Kim | H04R 1/1058 |
| | | | 381/370 |
| 2009/0268936 A1 | 10/2009 | Goldberg et al. | |
| 2010/0166207 A1 | 7/2010 | Masuyama | |
| 2010/0277304 A1* | 11/2010 | Haartsen | H04W 52/0274 |
| | | | 340/531 |
| 2011/0235817 A1 | 9/2011 | Lin | |
| 2016/0044401 A1 | 2/2016 | Lee et al. | |
| 2016/0205497 A1 | 7/2016 | Shen | |

FOREIGN PATENT DOCUMENTS

| | | |
|---|---|---|
| CN | 103631134 A | 3/2014 |
| CN | 104127010 A | 11/2014 |
| CN | 204145697 U | 2/2015 |
| CN | 104716994 A | 6/2015 |
| CN | 204408588 U | 6/2015 |
| CN | 105005354 A | 10/2015 |
| CN | 204945632 U | 1/2016 |
| EP | 2966413 A1 | 1/2016 |
| KR | 20080009979 A | 1/2008 |
| WO | 2009061223 A2 | 5/2009 |

OTHER PUBLICATIONS

Machine Translation and Abstract of Chinese Publication No. CN105005354, Oct. 28, 2015, 12 pages.

Machine Translation and Abstract of Chinese Publication No. CN201674630, Dec. 15, 2010, 8 pages.

Machine Translation and Abstract of Chinese Publication No. CN204145697, Feb. 4, 2015, 7 pages.

Machine Translation and Abstract of Chinese Publication No. CN204408588, Jun. 17, 2015, 9 pages.

Machine Translation and Abstract of Chinese Publication No. CN204945632, Jan. 6, 2016, 8 pages.

Machine Translation and Abstract of Korean Publication No. KR20080009979, Jan. 30, 2008, 7 pages.

Foreign Communication From a Counterpart Application, Chinese Application No. 201680035440.8, Chinese Office Action dated Feb. 27, 2019, 5 pages.

Foreign Communication From a Counterpart Application, European Application No. 16915424.2, Extended European Search Report dated May 8, 2019, 9 pages.

Foreign Communication From a Counterpart Application, PCT Application No. PCT/CN2016/098205, English Translation of International Search Report dated May 31, 2017, 3 pages.

Foreign Communication From a Counterpart Application, PCT Application No. PCT/CN2016/098205, English Translation of Written Opinion dated May 31, 2017, 4 pages.

\* cited by examiner

INTELLIGENT DEVICE HAVING DETACHABLE BODIES

CROSS-REFERENCE TO RELATED APPLICATIONS

This application is a U.S. National Stage of International Patent Application No. PCT/CN2016/098205 filed on Sep. 6, 2016, which is hereby incorporated by reference in its entirety.

TECHNICAL FIELD

The present invention relates to an intelligent device, and in particular, to an intelligent device having detachable bodies.

BACKGROUND

An intelligent device having detachable bodies needs to detect a connection status of different bodies in the device in many application scenarios. For example, for a hand ring having a detachable Bluetooth headset in wearable devices, when a call is to be received, a user detaches the Bluetooth headset from a wristband of the hand ring, and hangs the Bluetooth headset on ears of the user to receive the call. In this case, the hand ring needs to detect whether the Bluetooth headset is separated from the wristband, and if the Bluetooth headset is separated from the wristband, the call is received by using the headset. For another example, for an intelligent headset, the intelligent headset includes two headset bodies, and the headset body includes components such as a circuit board, a headset element on the circuit board, and a housing. The intelligent headset has a limited device size and a weak battery endurance capability. The left and right headset bodies are separated when the intelligent headset is normally used by a user, and the left and right headset bodies may be attached when the intelligent headset is not used. Therefore, the intelligent headset is convenient to carry and can enter a power saving mode. It can be determined, by detecting whether the two headset bodies are separated, whether the intelligent headset is in a use state. If the intelligent headset is in a non-use state, the intelligent headset may be triggered to enter a low power consumption mode.

In the prior art, usually, whether two bodies are separated is detected by using distance detection, infrared detection, or detection by a Hall effect sensor, or by using another manner, but external interference often exists. Consequently, detection accuracy is not high, and it bothers a user during use.

SUMMARY

Embodiments of the present invention provide an intelligent device, so as to improve accuracy of detecting a state of detachable bodies of the intelligent device.

An embodiment of the present invention provides an intelligent device having detachable bodies. The intelligent device includes a first body and a second body. A Hall effect sensor and a first attraction magnet pair are disposed in the first body; and an induced magnet and a second attraction magnet pair are disposed in the second body. The first body is attracted to the second body by using the first attraction magnet pair and the second attraction magnet pair. The first attraction magnet pair includes a third attraction magnet and a fourth attraction magnet close to the third attraction magnet. Magnetic poles of the third attraction magnet and the fourth attraction magnet are opposite; a north pole-south pole axis of the third attraction magnet is roughly parallel to a north pole-south pole axis of the fourth attraction magnet; and a magnetic pole of one end of each of the third attraction magnet and the fourth attraction magnet faces an attraction surface of the first body.

The second attraction magnet pair includes a fifth attraction magnet and a sixth attraction magnet. The fifth attraction magnet and the sixth attraction magnet are respectively attracted to the third attraction magnet and the fourth attraction magnet. Directions of magnetic poles of the fifth attraction magnet and the sixth attraction magnet are opposite; a north pole-south pole axis of the fifth attraction magnet is roughly parallel to a north pole-south pole axis of the sixth attraction magnet; and a magnetic pole of one end of each of the fifth attraction magnet and the sixth attraction magnet faces an attraction surface of the second body.

In a state in which the first body is attracted to the second body, the Hall effect sensor is disposed in a range of a magnetic field produced by the induced magnet, and the Hall effect sensor senses the magnetic field of the induced magnet and sends an indication signal.

Each attraction magnet pair includes two magnets having opposite polarities and disposed side by side. Such an attraction magnet combination reduces strength of a magnetic field in a direction of a non-magnetic pole, thereby reducing interference to detection on the magnetic field by the Hall effect sensor.

In a feasible implementation, the third attraction magnet and the fourth attraction magnet are attached and disposed in the first body. The two magnets are closely attached, so that a magnetic induction line from a direction of a magnetic pole of an opposite party can be effectively attracted, thereby reducing impact on an element around the magnet pair.

In a feasible implementation, the fifth attraction magnet and the sixth attraction magnet are attached and disposed in the second body.

In a feasible implementation, a flat plane is provided on each of a housing of the first body and a housing of the second body as the attraction surface.

In a feasible implementation, a magnetic induction line receiving surface of the Hall effect sensor is roughly parallel to the attraction surface of the first body; and a direction of a north pole-south pole axis of the induced magnet is roughly perpendicular to the attraction surface of the second body.

In a feasible implementation, a magnetic induction line receiving surface of the Hall effect sensor is roughly perpendicular to the attraction surface of the first body; and a direction of a north pole-south pole axis of the induced magnet is roughly parallel to the attraction surface of the second body.

In a feasible implementation, a size of the third attraction magnet is roughly the same as a size of the fourth attraction magnet, and a size of the fifth attraction magnet is roughly the same as a size of the sixth attraction magnet.

The sizes of the magnets forming the attraction magnet pair are roughly the same, so that strength of a magnetic field affecting the induced magnet and the Hall effect sensor can be effectively reduced.

In a feasible implementation, the first body and the second body are respectively headset bodies of an intelligent headset.

In a feasible implementation, the intelligent device enables a power saving mode according to the signal sent by the Hall effect sensor.

In the attracted state, the third attraction magnet and the fourth attraction magnet that are combined together are attracted to the fifth attraction magnet and the sixth attraction magnet that are combined together. Because the third attraction magnet and the fourth attraction magnet have opposite polarities and are disposed side by side, and the fifth attraction magnet and the sixth attraction magnet also have opposite polarities and are disposed side by side, after the third attraction magnet and the fourth attraction magnet are attracted to the fifth attraction magnet and the sixth attraction magnet, a magnetic field is mainly formed between the third attraction magnet and the fourth attraction magnet, and between the fifth attraction magnet and the sixth attraction magnet. Impact on a magnetic field of a magnet disposed nearby is relatively small. It is advantageous for the Hall effect sensor to detect the magnetic field of the magnet and send the indication signal.

According to another aspect, an intelligent device having detachable bodies is provided. The intelligent device includes a first body and a second body. A Hall effect sensor and a first magnet are disposed in the first body. A magnet and a second magnet are disposed in the second body. The first body and the second body are detachably disposed, and are attracted by using the first magnet and the second magnet. Directions of north pole-south pole axes of the first magnet and the second magnet are parallel to an attraction surface; and the first magnet and the second magnet are disposed in such a manner that a polarity of the first magnet is opposite to a polarity of the second magnet, so that in an attracted state, the first magnet is attracted to the second magnet.

Magnetic pole axes of the two attracted magnets are set to be parallel to the attraction surface, so that directions of magnetic induction lines of the attraction magnets are parallel to a receiving surface of the Hall effect sensor, thereby effectively reducing impact of the two attracted magnets on the Hall effect sensor and the magnet.

The terms "roughly parallel" used in the embodiments of the present invention may be explained as being parallel, being almost parallel, or having a preset angle; and the terms "roughly perpendicular" may be explained as being perpendicular, being almost perpendicular, or having a preset angle.

BRIEF DESCRIPTION OF DRAWINGS

To describe the technical solutions in the embodiments of the present invention more clearly, the following briefly describes the accompanying drawings required for the embodiments.

DESCRIPTION OF EMBODIMENTS

Embodiments of the present invention provide an intelligent device having detachable bodies. For ease of description, an example in which the intelligent device in the embodiments of the present invention is an intelligent headset, and the detachable bodies are respectively left and right headset bodies of the intelligent headset is used for description. A person skilled in the art may understand that, another intelligent device having detachable bodies that can be in a separated state or an attached state is also applicable to the present invention, and the intelligent device described herein may include at least two bodies.

Figure 1:
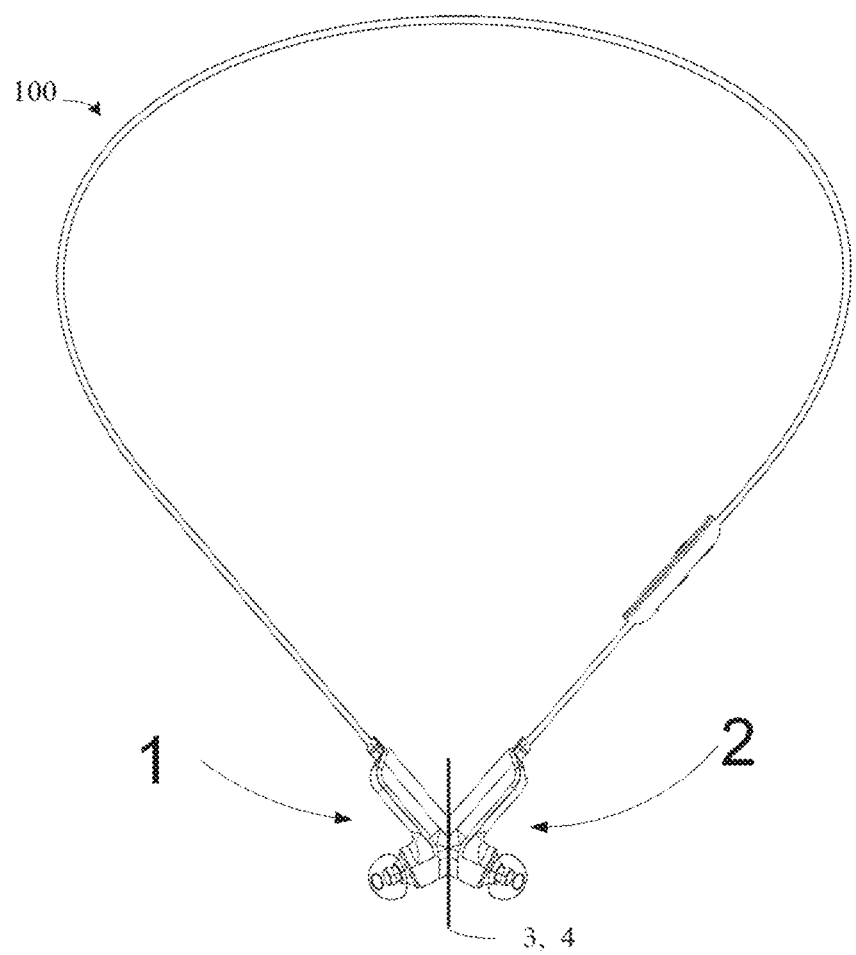
FIG. 1 is a schematic diagram of an entirety of an intelligent headset according to an embodiment of the present invention.

As shown in FIG. 1, an intelligent headset 100 includes a first headset body 1 and a second headset body 2. Ends of the two headset bodies are connected by using a connection wire, and the other ends are detachably attracted by using magnets in the headset bodies. When being used by a user, the two headset bodies are respectively secured to left and right ears of the user, and are in a separated state. Herein, use means that the intelligent headset plays music, a speech, or an audio file, and the user listens to the music, the speech, or the audio file by using the two headsets.

When the user does not need to use the two headset bodies, the two headset bodies may be in an attracted state (as shown in FIG. 1) and are convenient to secure and carry, for example, may be hung around the neck of the user as a decoration. The intelligent headset can determine, by detecting the separated or attracted state of the two headset bodies, whether the intelligent headset is in a state of being used by the user or in a working state. If the two headset bodies are attracted, it is determined that the user does not use the intelligent headset. If the two headset bodies are separated, it may be considered that the user uses the intelligent headset. The intelligent headset in a non-use state may enter a low power consumption mode, to save electricity.

Figure 2:
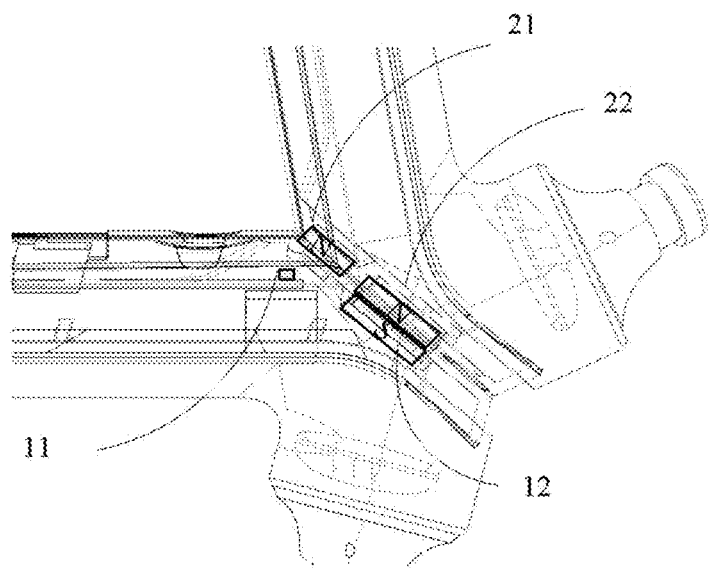
FIG. 2 is a schematic diagram of a state in which two headset bodies of an intelligent headset are attracted.

Referring to FIG. 2, currently, the two headset bodies of the intelligent headset are attracted by using a first attraction magnet 12 and a second attraction magnet 22 that are respectively disposed in the two headset bodies. The first attraction magnet 12 and a Hall effect sensor 11 are disposed in the first headset body 1. The second attraction magnet 22 and an induced magnet 21 are disposed in the second headset body 2 together. Specifically, the Hall effect sensor 11 is installed on a circuit board 13 in a housing of the first headset body 1. When the first headset body 1 and the second headset body 2 are in an attracted state, the Hall effect sensor 11 senses a magnetic field produced by the induced magnet 21 and sends an indication signal. The intelligent headset determines, according to the indication signal, that the first headset body 1 and the second headset body 2 are attracted, that is, are in a non-use state. In the attracted state, an attraction surface 3 of the first headset body 1 is attached to an attraction surface 4 of the second headset body 2 (as shown in FIG. 1), and a common attachment surface 6 is formed after the attachment.

Figure 3:
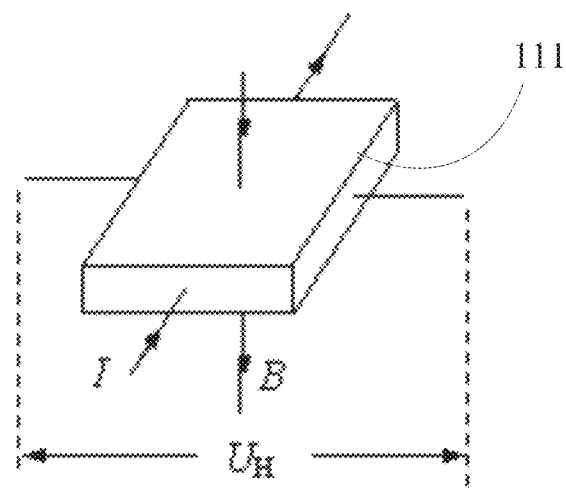
FIG. 3 is a schematic structural diagram of a Hall effect sensor in the prior art.

As shown in FIG. 3, the Hall effect sensor includes a Hall element 111. An example in which the Hall element 111 is a semi-conductor slice is used. A control current I is conducted to two ends of the slice. When a uniform magnetic field of magnetic flux density B is applied in a vertical direction of the slice, in a direction perpendicular to the current and the magnetic field, a Hall voltage being an electric potential difference UH is generated. A relationship therebetween is $$U_H = k\frac{IB}{d}.$$

In the formula, d is a thickness of the slice, k is referred to as a Hall coefficient, and a value of k is related to a material of the slice. The Hall element 111 produces a very small electric potential difference. Therefore, generally, the Hall element 111, an amplifier circuit, a temperature compensation circuit, a regulated power supply circuit, and the like are integrated into one chip, and the chip is referred to as a Hall effect sensor. The Hall effect sensor used in the embodiments of the present invention may be a linear Hall effect sensor including a Hall element, a linear amplifier, and an emitter follower and outputting an analog parameter. Alternatively, the Hall effect sensor may be a switching-type Hall effect sensor including a voltage stabilizer, a Hall element, a differential amplifier, a Schmitt trigger, and an output stage and outputting a digital parameter.

Any type of Hall effect sensor may be set to output different signals according to strength of different detected magnetic fields, so as to send different indication signals; and the intelligent headset determines, according to the indication signal, whether the two headset bodies are in the attracted state or in the separated state. The intelligent headset body controls, according to the indication signal, the intelligent headset body to enter a power saving mode. Specifically, if it is determined that the two headset bodies are in the attracted state, it indicates that the intelligent headset is in the non-use state, and the intelligent headset body may be controlled to enter the power saving mode. If it is determined that the two headset bodies are in the separated state, the intelligent headset is controlled to enter a working mode. This part is a technology understood by a person of ordinary skill in the art. For ease of description, in the embodiments of the present invention, subsequently, an indication signal is output to indicate that the Hall effect sensor outputs the indication signal according to a detected magnetic field in the attracted state, and the intelligent headset may determine, according to the indication signal, that the two headset bodies are in the attracted state. Specific details of whether the Hall effect sensor specifically outputs a high level or a low level, how the intelligent headset body determines, according to the signal output by the Hall effect sensor, that the two headset bodies are in the attracted state, and the like are not described again.

Figure 4:
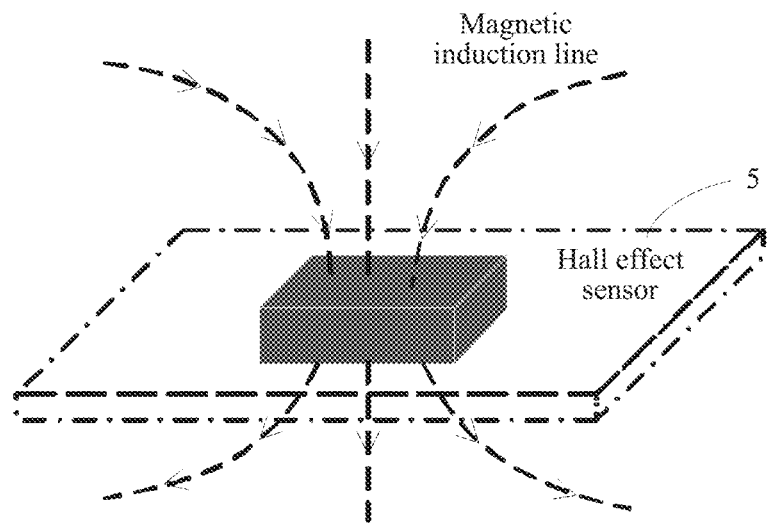
FIG. 4 is a schematic diagram of detecting, by a Hall effect sensor, a magnetic induction line vertically passing through a receiving surface of the Hall effect sensor.
Figure 5:
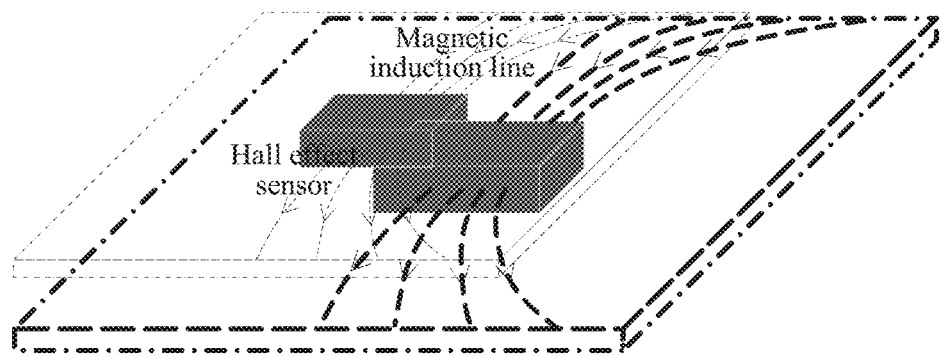
FIG. 5 is a schematic diagram of a magnetic induction line passing through a Hall effect sensor in parallel in the prior art.

For ease of description, a surface that is of the Hall element 111, that is, the semi-conductor slice, and on which a magnetic induction line produced by the induced magnet 21 is vertically received is referred to as a receiving surface 5 of the Hall effect sensor (as shown in FIG. 4). When a vertical equivalent component of the magnetic field produced by the induced magnet 21 that passes through the receiving surface 5 of the Hall effect sensor exceeds a threshold, the Hall effect sensor outputs an indication signal. It should be explained that, either a monopolar Hall effect sensor or a bipolar Hall effect sensor may be selected as the Hall effect sensor in the embodiments of the present invention. A manufacturer may correspondingly set a position of the induced magnet 21 according to a selected Hall effect sensor. For example, if a monopolar Hall effect sensor is selected, the monopolar Hall effect sensor needs to receive a magnetic induction line that is perpendicular to the receiving surface 5 and that is in a direction from the Hall effect sensor to the induced magnet 21, so that an S pole of the induced magnet 21 needs to face an attraction surface 6, and an N pole of the induced magnet 21 needs to be reverse to the attraction surface. Certainly, a polarity of the Hall effect sensor may be not limited, as long as magnetic flux passing through the Hall effect sensor reaches a threshold for triggering the Hall effect sensor. In addition, as shown in FIG. 5, when the magnetic field passes through the Hall element 111 of the Hall effect sensor in parallel, that is, is roughly parallel to the receiving surface, a vertical equivalent component of a magnetic induction line passing through the receiving surface of the Hall effect sensor is zero or near to zero, and the Hall effect sensor outputs no indication signal or outputs a separation indication signal.

A general principle of the Hall effect sensor in the embodiments of the present invention is briefly described above, but according to a disposition manner of the attraction magnets 12 and 22, the induced magnet 21, and the Hall effect sensor 11 in FIG. 2, detection accuracy of the Hall effect sensor is still affected. The reason is that, for a miniaturized intelligent device, a disposition distance between the Hall effect sensor 11 and the first attraction magnet 12 and/or the second attraction magnet 22 is limited, and in the state in which the two magnets are attracted or separated, the Hall effect sensor 11 is very likely to be interfered by a magnetic field produced by the first attraction magnet 12 and/or the second attraction magnet 22, resulting in that the Hall effect sensor 11 sends an incorrect indication signal or sends no indication signal. For example, with reference to FIG. 6 and FIG. 7, in the state in which the two headset bodies are separated, the Hall effect sensor 11 detects the magnetic field produced by the first attraction magnet 12, and sends an incorrect indication signal. Consequently, the intelligent headset incorrectly determines that the headset bodies are in the attracted state. A solution is to limit the polarity of the Hall effect sensor and use a monopolar Hall effect sensor. The monopolar Hall effect sensor can sense only a magnetic field in a single specified direction (for example, an N pole), so that a direction of the magnetic field of the first attraction magnet 12 that passes through Hall effect sensor does not meet a polarity requirement of the Hall effect sensor, and the Hall effect sensor is not triggered. However, in this case, on one hand, selection of the Hall effect sensor is limited, only a monopolar Hall effect sensor can be used, and an omnipolar Hall effect sensor (a bipolar Hall effect sensor) cannot be used. The omnipolar Hall effect sensor can sense a magnetic field in a direction of an N pole or an S pole. For example, the monopolar Hall effect sensor can sense only a magnetic field that is of an induction coil perpendicular to the Hall effect sensor and that is from top to bottom or from bottom to top. The bipolar Hall effect sensor can sense magnetic fields that are of induction coils perpendicular to the Hall effect sensor and that are from top to bottom and from bottom to top.

Figure 6:
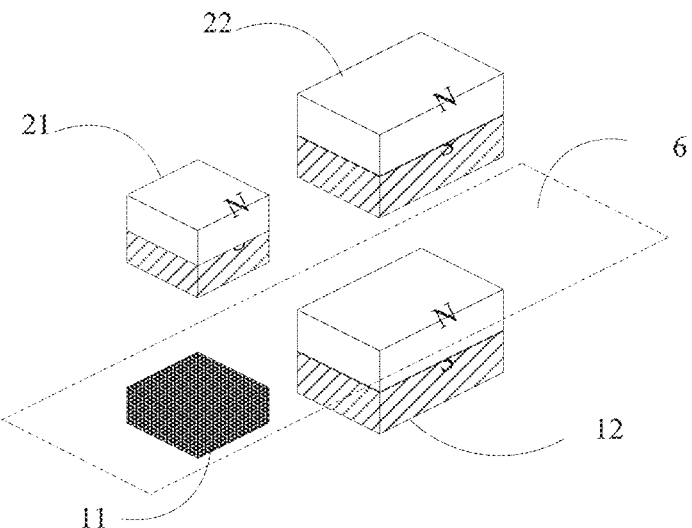
FIG. 6 is a schematic diagram of an arrangement structure of a magnet and a Hall effect sensor in an intelligent headset in the prior art.
Figure 7:
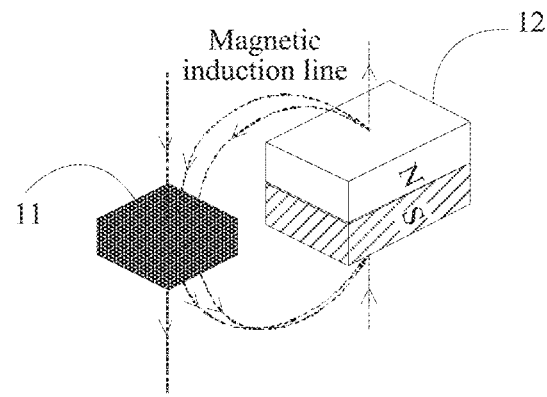
FIG. 7 is a schematic diagram of affecting a Hall effect sensor by a magnetic field of an attraction magnet in the prior art.
Figure 8:
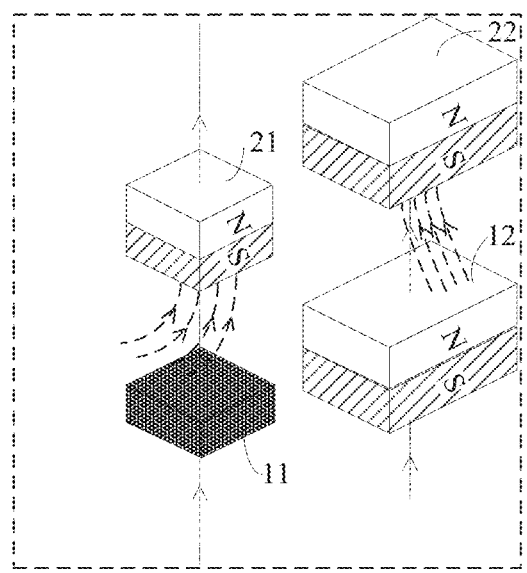
FIG. 8 is a schematic diagram of affecting a magnetic field of an induced magnet by an attraction magnet in an intelligent headset in the prior art.

On the other hand, as shown in FIG. 6, when the two headset bodies are attracted, polarities of ends of the first attraction magnet 12 and the second attraction magnet 22 that face the attraction surfaces of the two magnets are opposite, so that the two magnets are attracted because of the opposite polarities. The attachment surface 6 is a contact surface or an attachment surface of the two headset bodies when the attachment surface 3 of the first headset body and the attachment surface 4 of the second headset body are in an attracted state. Referring to FIG. 8, because a size of the miniaturized intelligent device is limited, a distance between magnets in FIG. 8 is limited, and the first attraction magnet 12 and the second attraction magnet 22 that are in the attracted state repel or attract the induced magnet 21. In FIG. 8, there is still a gap between the first attraction magnet 12 and the second attraction magnet 22 in the attracted state. In a product, usually, two magnets are not directly disposed on an attraction surface, and usually, two headset bodies need to be protected by housings. The first attraction magnet 12 and the second attraction magnet 22 are disposed at positions that are in the housings and that are close to the attraction surface. Therefore, even if the two headset bodies are attached, there is still a gap between the two magnets and the two magnets cannot be easily attached seamlessly. A state of the induced magnet 21 and the Hall effect sensor 11 is similar to this.

In this way, the magnetic field of the induced magnet 21 may deviate from a receiving area of the Hall effect sensor. Consequently, in the attracted state, a magnetic induction line of the induced magnet 21 that passes through the Hall effect sensor 11 cannot enable the Hall effect sensor to generate a sensing signal, and therefore, the Hall effect sensor cannot send an indication signal. Accordingly, the intelligent headset incorrectly determines that the headsets are still in the separated state. However, such a problem may also be resolved by adjusting an angle of the Hall effect sensor 11. For example, the angle of the Hall effect sensor 11 is adjusted, so that in the state in which the two headsets are attracted, the receiving surface of the Hall effect sensor 21 is attached to the induced magnet 21. Even if the magnetic field of the induced magnet 21 is interfered by the attraction magnet and deviates, the magnetic induction line of the induced magnet 21 still certainly passes through the Hall effect sensor 11. However, in this case, there is a strict requirement on positions of the Hall effect sensor 11 and the induced magnet 21. Although this is also technically feasible, a size and a structural design of a current headset are greatly limited accordingly.

Therefore, to reduce impact of the attraction magnet on the Hall effect sensor, disposition positions of the Hall effect sensor and the magnet are not limited, and the polarity of the Hall effect sensor is not limited either, so that space of the product is saved during manufacturing, and higher flexibility is achieved. In the embodiments of the present invention, a solution in the present invention is described in detail by using the following specific example.

Figure 9:
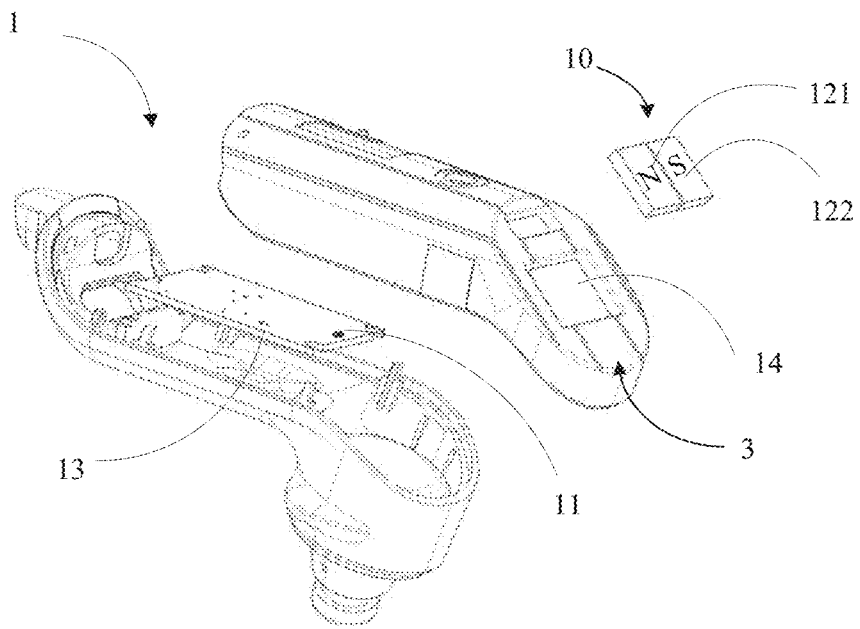
FIG. 9 is a schematic diagram of a decomposition structure of one headset body in an intelligent headset according to an embodiment of the present invention.

Referring to FIG. 9, an implementation in the present invention is described by using the intelligent headset as an example. In FIG. 9, the first headset body 1 includes the housing, a circuit board 13, and a first attraction magnet pair 10. The circuit board 13 is installed in the housing, and the Hall effect sensor 11 is disposed on the circuit board 13. Certainly, headset related components such as a processor, a memory, and a radio transceiver may further be disposed on the circuit board 13, and are not described one by one in this embodiment. The housing has a plane. The plane is a plane on which the two headset bodies are attracted. The plane is defined as the attachment surface 3 of the first headset body 1. The Hall effect sensor 11 is located at one end of the circuit board 13 close to the attachment surface 3, and corresponds to the position of the induced magnet 21. That is, in the attracted state, the Hall effect sensor 11 is disposed in a range of the magnetic field produced by the induced magnet 21, so as to sense, in the attracted state, the magnetic field produced by the induced magnet 21 in the second headset body 2. A first groove 14 is provided on the attachment surface 3 of the first headset body 1 and is configured to accommodate the first attraction magnet pair 10. A north pole-south pole axis of the first attraction magnet pair 10 is roughly perpendicular to the attachment surface 3, and the first attraction magnet pair 10 is secured in the first groove 14. The first attraction magnet pair 10 includes a third attraction magnet 121 and a fourth attraction magnet 122. Arrangement of the magnet in the second headset body 2 is first briefly described below, and then, an arrangement manner of the first attraction magnet pair 10 is further correspondingly described with reference to the arrangement of the magnet in the second headset body 2. The north pole-south pole axis is a vector of the magnet from an N pole to an S pole, that is, directions of magnetic poles. A magnetic pole is a part having strongest magnetism in a magnetic body. When a magnetic body freely rotating on a horizontal plane is still, there is always a magnetic pole pointing to the south, and the other magnetic pole pointing to the north. The magnetic pole pointing to the south is referred to as a south pole (S pole), and the magnetic pole pointing to the north is referred to as a north pole (N pole).

Figure 10:
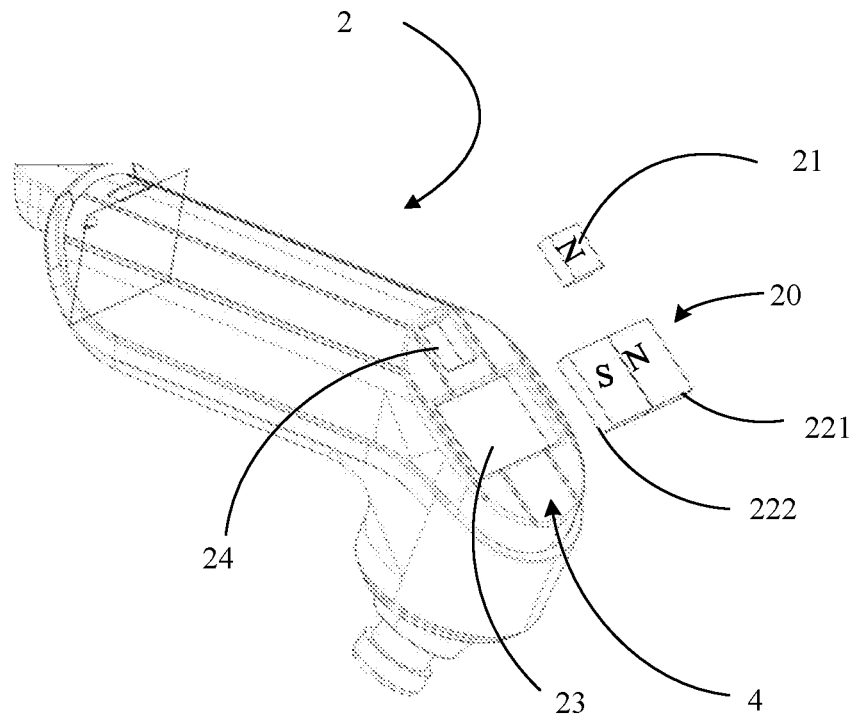
FIG. 10 is a schematic diagram of a decomposition structure of the other headset body in an intelligent headset according to an embodiment of the present invention.
Figure 11:
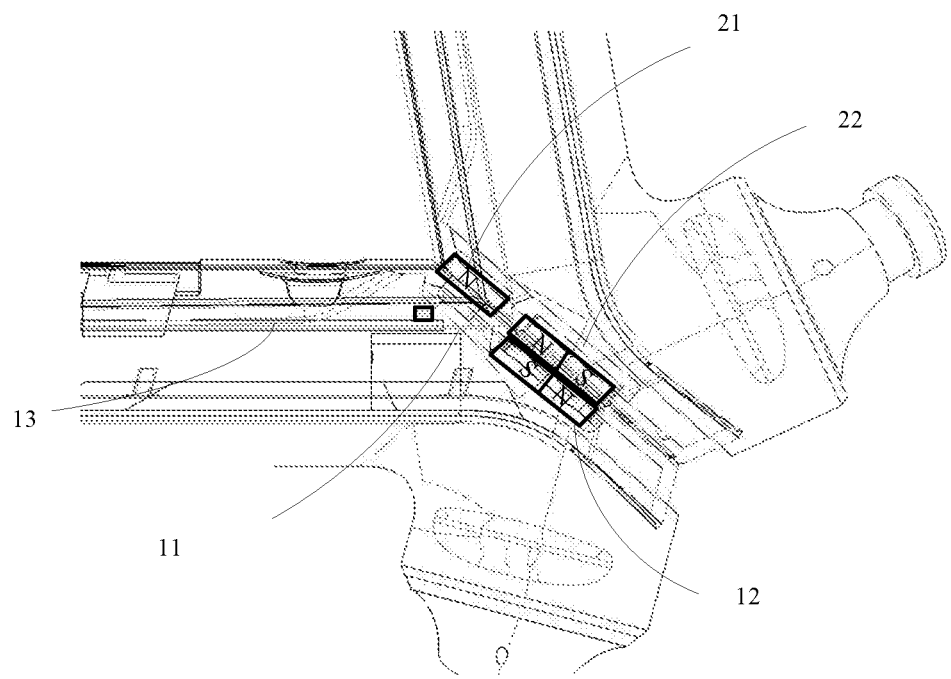
FIG. 11 is a schematic diagram of a state in which two headset bodies in an intelligent headset are attracted according to an embodiment of the present invention.

Referring to FIG. 10 and FIG. 11, a second groove 23 and a third groove 24 are provided on the attachment surface 4 of the second headset body 2. The second groove 23 is configured to accommodate a second attraction magnet pair 20, and the third groove 24 is configured to accommodate the induced magnet 21. The second attraction magnet pair 20 includes a fifth attraction magnet 221 and a sixth attraction magnet 222. In the attracted state, the second groove 23 is opposite to the first groove 14 of the first headset body 1. The induced magnet 21 is close to the Hall effect sensor 11. The third attraction magnet 121 and the fourth attraction magnet 122 are respectively attracted to the fifth attraction magnet 221 and the sixth attraction magnet 222 under the action of respective attraction, or they may be attracted at another angle. The attraction is not limited to being implemented by using the attachment surface 6. Herein, this is only an embodiment.

Specifically, north pole-south pole axes of the third and fourth attraction magnets of the first attraction magnet pair 10 are respectively roughly perpendicular to the attachment surface 3 of the first headset body 1, and directions of magnetic poles are opposite. Further, a magnetic pole (an N pole or an S pole) of one end of each of the third and fourth attraction magnets faces the attachment surface 3.

Figure 12:
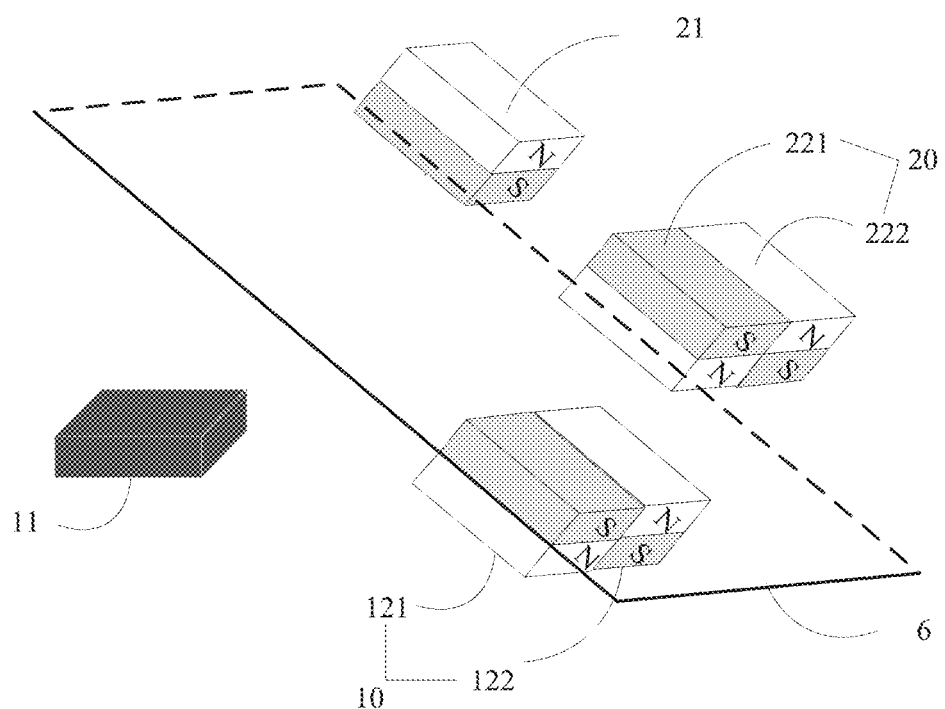
FIG. 12 is a schematic diagram of arrangement of an attraction magnet pair and a Hall effect sensor in an intelligent headset according to an embodiment of the present invention.

Referring to FIG. 12, in an implementation, the third attraction magnet 121 may be disposed next to the fourth attraction magnet 122. In this embodiment, a magnetic pole of one end of the third attraction magnet 121 close to the attachment surface 6 is the south pole, and a magnetic pole of one end of the fourth attraction magnet 122 close to the attachment surface 6 is the north pole. Alternatively, a magnetic pole of one end of the third attraction magnet 121 close to the attachment surface 6 is the north pole, and a magnetic pole of one end of the fourth attraction magnet 122 close to the attachment surface 6 is the south pole. In conclusion, in the embodiments of the present invention, polar ends of the third attraction magnet 121 and the fourth attraction magnet 122 are both close to the attachment surface 6, and polarities of the ends of the third and fourth attraction magnets close to the attachment surface 6 are opposite.

It may be understood that, a gap is also allowed between the third attraction magnet 121 and the attachment surface 3 of the first headset body and between the fourth attraction magnet 122 and the attachment surface 3 of the first headset body; or another element is disposed between the ends of the third attraction magnet 121 and the fourth attraction magnet 122 that face the attachment surface 3 and the housings. It is considered that when the two headset bodies are attracted, a relatively strong magnetic field is required. To produce relatively strong attraction, preferably, the third attraction magnet 121 and the fourth attraction magnet 122 are as close as possible to the attachment surface 3.

Optionally, there may also be a gap between the third attraction magnet 121 and the fourth attraction magnet 122.

Figure 13:
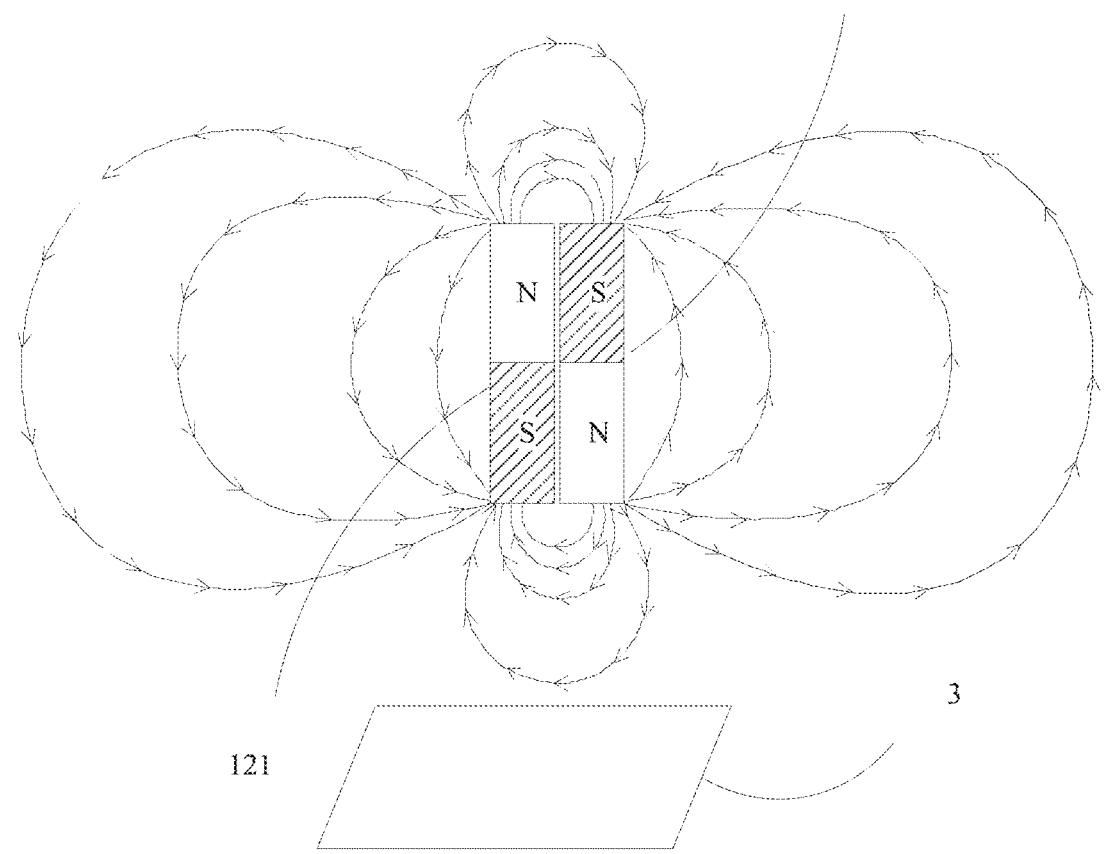
FIG. 13 is a schematic diagram of distribution of a magnetic field of a single attraction magnet pair in an intelligent headset according to an embodiment of the present invention.

FIG. 13 is a diagram of a magnetic field in a cross section after the third attraction magnet 121 is combined with the fourth attraction magnet 122. In this embodiment, the third attraction magnet 121 and the fourth attraction magnet 122 are disposed according to the foregoing arrangement manner, so that impact of the first attraction magnet pair on the Hall effect sensor can be reduced. A principle is that, a relatively strong magnetic field is formed between the south pole of the third attraction magnet 121 and the north pole of the fourth attraction magnet 122 that is located at a same end, so that magnetic fields formed between the south poles and the north poles of the third attraction magnet 121 and the fourth attraction magnet 122 are greatly weakened. That is, some of magnetic lines originally emitted from the north pole of the third attraction magnet 121 enter the south pole of the fourth attraction magnet 122, and very few magnetic lines enter the south pole of the third attraction magnet 121. Similarly, some of magnetic lines originally emitted from the north pole of the fourth attraction magnet 122 enter the south pole of the third attraction magnet 121, and very few magnetic lines enter the south pole of the fourth attraction magnet 122. That is, some of original magnetic induction lines from the north pole to the south pole of the third or fourth attraction magnet are converted to be in a direction from the north pole of the third attraction magnet 121 to the south pole of the fourth attraction magnet 122, or in a direction from the north pole of the fourth attraction magnet 122 to the south pole of the third attraction magnet 121. In this way, a magnetic field of a combination of the third attraction magnet 121 and the fourth attraction magnet 122 that affects the outside is weakened.

In FIG. 13, higher density of magnetic lines indicates a stronger magnetic field; on the contrary, lower density of magnetic lines indicates a weaker magnetic field. At the ends of the third attraction magnet 121 and the fourth attraction magnet 122 close to the attachment surface 3, a relatively strong magnetic field is formed between the south pole of the third attraction magnet 121 and the north pole of the fourth attraction magnet 122, and density of magnetic lines therebetween is relatively high. That is, the north pole of the fourth attraction magnet 122 is subject to relatively strong attraction from a magnetic field at the south pole of the third attraction magnet 121, and most of magnetic induction lines produced at the north pole of the fourth attraction magnet 122 enter the south pole of the third attraction magnet 121. Similarly, at the ends of the third attraction magnet 121 and the fourth attraction magnet 122 away from the attachment surface 3, a relatively strong magnetic field is also formed between the north pole of the third attraction magnet 121 and the south pole of the fourth attraction magnet 122. The magnetic field between the south and north poles of the third attraction magnet 121 or the fourth attraction magnet 122 is weakened. The Hall effect sensor is located at one side of the third attraction magnet 121 or the fourth attraction magnet 122. Because magnetic fields at two sides of the third attraction magnet 121 or the fourth attraction magnet 122 are greatly weakened, very few magnetic lines of the third or fourth attraction magnet pass through the Hall effect sensor 11, so that the Hall effect sensor is prevented from performing incorrect detection.

It should be noted that, to weaken the magnetic field between the south and north poles of the third attraction magnet 121 or the fourth attraction magnet 122, distances between the two polar ends of the third attraction magnet 121 and the two opposite polar ends of the fourth attraction magnet 122 need to be as short as possible, and shorter distances indicate higher magnetic permeability between the polar ends of the third attraction magnet 121 and the fourth attraction magnet 122. A magnetic line always travels along a path with highest magnetic permeability (that is, lowest magnetic resistance). That is, the magnetic field formed between the polar ends of the third attraction magnet 121 and the fourth attraction magnet 122 is stronger, and the magnetic field formed between the south and north poles of the third attraction magnet 121 or the fourth attraction magnet 122 is weaker. When the third attraction magnet 121 is attached to the fourth attraction magnet 122, a best effect is achieved.

A relatively strong magnetic field is formed between the polar end of the third attraction magnet 121 and the polar end of the fourth attraction magnet 122 after the combination, and the magnetic field formed between the south and north poles of the third attraction magnet 121 or the fourth attraction magnet 122 is weakened. Therefore, impact on the Hall effect sensor 11 disposed near the third attraction magnet 121 and the fourth attraction magnet 122 is reduced. In this way, a position for installing the Hall effect sensor 11 can be flexibly selected, to reduce a size of the intelligent device. Therefore, larger design space is reserved for a structural design and an appearance design of the headset body. Further, a monopolar Hall effect sensor 11 or an omnipolar Hall effect sensor 11 may be selected. Therefore, impact of a magnetic field of the first attraction magnet pair 10 on the Hall effect sensor 11 does not need to be prevented or reduced based on monopolarity.

In the embodiments of the present invention, a flat plane is provided on each of the housings of the two headset bodies as the attachment surface, to facilitate attraction between the two headset bodies by using the flat plane. Certainly, in a different implementation, the attachment surface may be a curved surface or have another shape.

The second attraction magnet pair 20 is disposed in the second headset body 2, to be attracted to the first attraction magnet pair 10 in a matching manner. It is considered that the first attraction magnet pair 10 is the combination of the third attraction magnet 121 and the fourth attraction magnet 122, and to be better attracted to the first attraction magnet pair 10, the second attraction magnet pair 20 may include the fifth attraction magnet 221 and the sixth attraction magnet 222. A combination manner of the fifth attraction magnet 221 and the sixth attraction magnet 222 is similar to a combination manner of the third attraction magnet 121 and the fourth attraction magnet, and details are not described herein. In this way, impact of the second attraction magnet pair 20 on the induced magnet 21 is reduced. Certainly, at one end close to the attachment surface 4 of the second headset body, a polarity of the fifth attraction magnet 221 is opposite to a polarity of the third attraction magnet 121. Similarly, at one end close to the attachment surface 4, a polarity of the sixth attraction magnet 221 is opposite to a polarity of the fourth attraction magnet 122.

Figure 14:
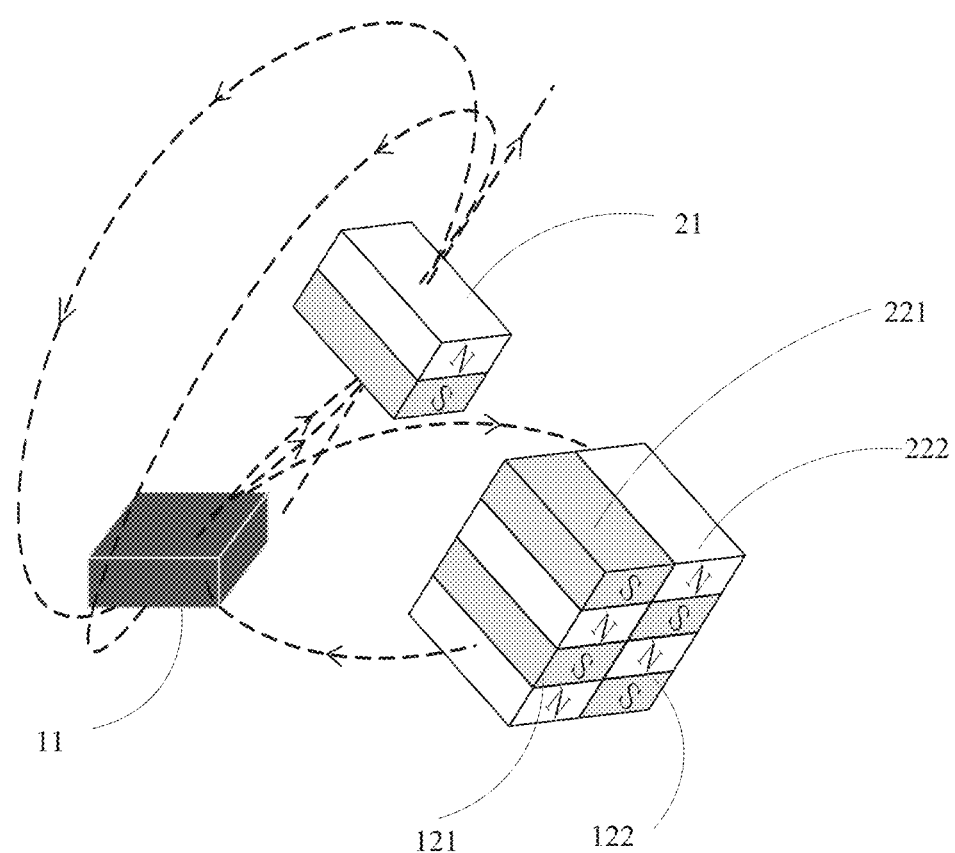
FIG. 14 is a schematic diagram of distribution of magnetic fields produced by a magnet and an attraction magnet in a state in which two headsets are attracted according to an embodiment of the present invention.

Referring to FIG. 14, in the attracted state, the third attraction magnet 121 and the fourth attraction magnet 122 that are combined together are attracted to the fifth attraction magnet 221 and the sixth attraction magnet 222 that are combined together. Due to the disposition position of the Hall effect sensor 11, the Hall effect sensor 11 may fail to be attached to the induced magnet 21. However, by using the design of the attraction magnets in the embodiments of the present invention, magnetic fields of the first attraction magnet pair 10 and the second attraction magnet pair 20 have very little impact on the induced magnet 21 and the Hall effect sensor. It is advantageous for the Hall effect sensor 11 to detect the magnetic field of the induced magnet 21 and send the indication signal. After the two headset bodies are separated, a magnetic field produced by the first magnet pair 10 does not interfere with the Hall effect sensor.

The Hall effect sensor 11 in the embodiments of the present invention senses a magnetic field of particular strength of the induced magnet 21, and sends an indication signal. The intelligent headset determines, according to the indication signal such as an indication signal of a high level output by the Hall effect sensor, that the first headset body 1 and the second headset body 2 are in the attracted state. When the first headset body 1 and the second headset body 2 are separated, for example, earbuds of the first and second headset bodies are placed at the two ears of the user, because a distance between the Hall effect sensor 11 and the induced magnet 21 that are respectively disposed in the first headset body 1 and the second headset body 2 is relatively long, the Hall effect sensor 11 cannot detect the magnetic field of the induced magnet 21, and the Hall effect sensor 11 triggers an indication signal, for example, sends an indication signal of a low level. In this case, the intelligent headset body determines, according to the indication signal of a low level, that the two headset bodies are separated, and the headset is in a use state currently.

Optionally, the receiving surface of the Hall effect sensor 11 may be considered to be disposed at a position perpendicular to the attachment surface 3. If the receiving surface is disposed in such a way, a direction of a magnetic pole of the induced magnet 21 needs to be set to be parallel to the attraction surface 3, so that a magnetic induction line of the induced magnet 21 can pass through the receiving surface of the Hall effect sensor 11, because the Hall effect sensor 11 can detect only a magnetic induction line vertically passing through the receiving surface of the Hall effect sensor 11 or a vertical equivalent component of a magnetic field that passes through the receiving surface, but cannot detect a magnetic induction line parallel to the receiving surface. By using such disposition, the attraction magnet pair does not affect the Hall effect sensor and the induced magnet 21.

Optionally, a size of the third attraction magnet 121 is roughly the same as a size of the fourth attraction magnet 122; and a size of the fifth attraction magnet 221 is roughly the same as a size of the sixth attraction magnet 222.

It should be noted that, the terms "roughly parallel" used in the embodiments of the present invention may be explained as being parallel, being almost parallel, or having a preset angle; and the terms "roughly perpendicular" may be explained as being perpendicular, being almost perpendicular, or having a preset angle.

Figure 15:
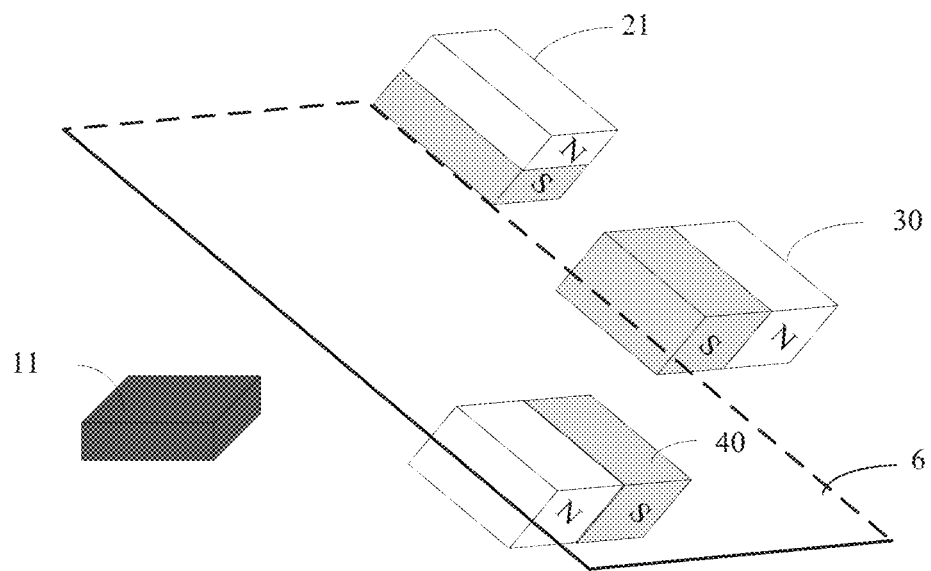
FIG. 15 is a schematic diagram of arrangement positions of a magnet and a Hall effect sensor in an intelligent headset according to another embodiment of the present invention.

In another embodiment, as shown in FIG. 15, the first attraction magnet pair includes a first magnet 30; and the second attraction magnet pair includes a second magnet 40. Other elements, for example, elements in the headset bodies such as the induced magnet 21, the Hall effect sensor 11, and a printed circuit board are the same as those in the descriptions of the foregoing embodiments, and details are not described herein. A difference lies in that, directions of north pole-south pole axes of the first magnet 30 and the second magnet 40 are parallel to the attachment surface 6, and the first magnet 30 and the second magnet 40 are disposed in such a manner that a polarity of the first magnet 30 is opposite to a polarity of the second magnet 40, so that when the headsets are attracted, the first magnet 30 attracts the second magnet 40.

Magnetic pole axes of the two attracted magnets are set to be parallel to the attraction surface, so that impact of the two attracted magnets on the Hall effect sensor and the magnet can be effectively reduced.

In the embodiments, for ease of understanding, only the intelligent headset body is used as an example for description. A person skilled in the art may understand that, the present invention is also applicable to another apparatus that detects, by using attraction of magnets and by using a Hall effect sensor, whether two ends are attracted.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An intelligent device comprising:
    a first body, wherein a Hall effect sensor and a first attraction magnet pair are disposed in the first body, wherein the first attraction magnet pair comprises a third attraction magnet and a fourth attraction magnet proximate to the third attraction magnet, wherein magnetic poles of the third attraction magnet and the fourth attraction magnet are opposite, wherein a north pole-south pole axis of the third attraction magnet is parallel to a north pole-south pole axis of the fourth attraction magnet, and wherein a magnetic pole of one end of each of the third attraction magnet and the fourth attraction magnet faces an attraction surface of the first body; and
    a second body coupled to the first body, wherein an induced magnet and a second attraction magnet pair are disposed in the second body, wherein the first body is attracted to the second body using the first attraction magnet pair and the second attraction magnet pair, wherein the second attraction magnet pair comprises a fifth attraction magnet and a sixth attraction magnet, wherein the fifth attraction magnet and the sixth attraction magnet are respectively attracted to the third attraction magnet and the fourth attraction magnet, wherein directions of magnetic poles of the fifth attraction magnet and the sixth attraction magnet are opposite, wherein a north pole-south pole axis of the fifth attraction magnet is parallel to a north pole-south pole axis of the sixth attraction magnet, and wherein a magnetic pole of one end of each of the fifth attraction magnet and the sixth attraction magnet faces an attraction surface of the second body, and wherein in a state in which the first body is attracted to the second body, the Hall effect sensor is disposed in a range of a magnetic field of the induced magnet, and wherein the Hall effect sensor is configured to:

sense the magnetic field of the induced magnet; and send an indication signal.

2. The intelligent device of claim 1, wherein the third attraction magnet and the fourth attraction magnet are attached together and disposed in the first body.

3. The intelligent device of claim 1, wherein the fifth attraction magnet and the sixth attraction magnet are attached together and disposed in the second body.

4. The intelligent device of claim 1, wherein a flat plane is provided on a housing of the first body, and wherein the flat plane is the attraction surface of the first body.

5. The intelligent device of claim 1, wherein a flat plane is provided on a housing of the second body, and wherein the flat plane of the housing of the second body is the attraction surface of the second body.

6. The intelligent device of claim 1, wherein a magnetic induction line receiving surface of the Hall effect sensor is parallel to the attraction surface of the first body, and Wherein a direction of a north pole-south pole axis of the induced magnet is perpendicular to the attraction surface of the second body.

7. The intelligent device of claim 1, wherein a magnetic induction line receiving surface of the Hall effect sensor is perpendicular to the attraction surface of the first body, and wherein a direction of a north pole-south pole axis of the induced magnet is parallel to the attraction surface of the second body.

8. The intelligent device of claim 1, wherein a size of the third attraction magnet is the same as a size of the fourth attraction magnet, and wherein a size of the fifth attraction magnet is the same as a size of the sixth attraction magnet.

9. The intelligent device of claim 1, wherein the first body and the second body are respectively headset bodies of an intelligent headset.

10. The intelligent device of claim 1, wherein the intelligent device is configured to enable a power saving mode according to the indication signal sent by the Hall effect sensor.

11. The intelligent device of claim 1, wherein a circuit board is disposed in the first body.

12. The intelligent device of claim 11, wherein the Hall effect sensor is disposed at one end of the circuit board proximate to the attraction surface of the first body.

13. The intelligent device of claim 1, wherein a first groove is provided on the attraction surface of the first body.

14. The intelligent device of claim 13, wherein the first groove is configured to accommodate the first attraction magnet pair.

15. The intelligent device of claim 13, wherein a second groove is provided on the attraction surface of the second body.

16. The intelligent device of claim 15, wherein the second groove is configured to accommodate the second attraction magnet pair.

17. The intelligent device of claim 15, wherein in the state in which the first body is attracted to the second body, the second groove is opposite to the first groove.

18. The intelligent device of claim 1, wherein a third groove is provided on the attraction surface of the second body.

19. The intelligent device of claim 18, wherein the third groove is configured to accommodate the induced magnet.

20. The intelligent device of claim 1, wherein a gap exist between the third attraction magnet and the fourth attraction magnet.

* * * * *